(12) United States Patent
Austin et al.

(10) Patent No.: US 11,748,490 B2
(45) Date of Patent: ***Sep. 5, 2023

(54) COMPUTER SYSTEM WITH MOVING TARGET DEFENSES AGAINST VULNERABILITY ATTACKS

(71) Applicant: REGENTS OF THE UNIVERSITY OF MICHIGAN, Ann Arbor, MI (US)

(72) Inventors: Todd Austin, Ann Arbor, MI (US); Valeria Bertacco, Ann Arbor, MI (US); Mark Gallagher, Ann Arbor, MI (US); Baris Kasikci, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,053

(22) Filed: Dec. 30, 2021

(65) Prior Publication Data

US 2022/0129563 A1 Apr. 28, 2022

Related U.S. Application Data

(63) Continuation of application No. 16/546,850, filed on Aug. 21, 2019, now Pat. No. 11,232,212.
(Continued)

(51) Int. Cl.
*G06F 21/57* (2013.01)
*G06F 8/65* (2018.01)
(Continued)

(52) U.S. Cl.
CPC .............. *G06F 21/577* (2013.01); *G06F 8/65* (2013.01); *G06F 21/552* (2013.01);
(Continued)

(58) Field of Classification Search
CPC ........ G06F 21/577; G06F 8/65; G06F 21/552; G06F 21/554; G06F 21/566; G06F 21/602; G06F 2221/0751; H04L 9/0869
See application file for complete search history.

(56) References Cited

U.S. PATENT DOCUMENTS 9,392,017 B2   7/2016   Cui et al.
10,055,251 B1 * 8/2018   Cui .......................... G06F 9/461
(Continued)

OTHER PUBLICATIONS

International Search Report and Written Opinion for Application No. PCT/US2019/047507, dated Nov. 12, 2019.
(Continued)

*Primary Examiner* — Stephen T Gundry
(74) *Attorney, Agent, or Firm* — Marshall, Gerstein & Borun LLP

(57) ABSTRACT

A computer system includes an ensemble moving target defense architecture that protects the computer system against attack using one or more composable protection layers that change each churn cycle, thereby requiring an attacker to acquire information needed for an attack (e.g., code and pointers) and successfully deploy the attack, before the layers have changed state. Each layer may deploy a respective attack information asset protection providing multiple respective attack protections each churn cycle, wherein the respective attack information asset protections may differ.

19 Claims, 10 Drawing Sheets

Related U.S. Application Data

(60) Provisional application No. 62/720,489, filed on Aug. 21, 2018.

(51) Int. Cl.
*G06F 21/55* (2013.01)
*G06F 21/56* (2013.01)
*G06F 21/60* (2013.01)
*H04L 9/08* (2006.01)

(52) U.S. Cl.
CPC .......... *G06F 21/554* (2013.01); *G06F 21/566* (2013.01); *G06F 21/602* (2013.01); *H04L 9/0869* (2013.01); *G06F 2221/0751* (2013.01)

(56) References Cited

U.S. PATENT DOCUMENTS

| | | | |
|---|---|---|---|
| 10,102,379 B1 | 10/2018 | Seifert et al. | |
| 10,277,622 B2* | 4/2019 | DiGiambattista | G06F 21/554 |
| 10,310,991 B2 | 6/2019 | Okhravi et al. | |
| 10,585,660 B2* | 3/2020 | Murthy | G06F 9/4486 |
| 10,592,677 B2* | 3/2020 | Petratos | G06F 8/656 |
| 10,769,267 B1 | 9/2020 | Li et al. | |
| 10,783,241 B2* | 9/2020 | Crabtree | G06F 21/566 |
| 11,108,798 B2 | 8/2021 | Murphy et al. | |
| 11,240,268 B1* | 2/2022 | Lieberman | G06F 21/554 |
| 2007/0250666 A1 | 10/2007 | Sartorius et al. | |
| 2008/0016314 A1* | 1/2008 | Li | H04L 63/1441 |
| | | | 711/E12.091 |
| 2010/0050159 A1* | 2/2010 | Daniel | G06F 11/3624 |
| | | | 717/124 |
| 2010/0246443 A1 | 9/2010 | Cohn et al. | |
| 2015/0222657 A1 | 8/2015 | Chu et al. | |
| 2015/0318986 A1 | 11/2015 | Novak et al. | |
| 2015/0341382 A1 | 11/2015 | Jain | |
| 2016/0267280 A1 | 9/2016 | Mansour et al. | |
| 2016/0323313 A1* | 11/2016 | Narain | H04L 63/1475 |
| 2017/0169216 A1* | 6/2017 | Boehm | G06F 3/0673 |
| 2017/0357808 A1* | 12/2017 | Arroyo | G06F 21/57 |
| 2018/0046585 A1* | 2/2018 | Okhravi | G06F 12/023 |
| 2018/0159887 A1 | 6/2018 | DiGiambattista et al. | |
| 2018/0260559 A1* | 9/2018 | Jarrous | G06F 9/44521 |
| 2018/0268130 A1* | 9/2018 | Ghosh | G06F 21/53 |
| 2018/0276372 A1 | 9/2018 | Crabtree et al. | |
| 2018/0309786 A1* | 10/2018 | Apelewicz | H04W 12/04 |
| 2018/0332073 A1* | 11/2018 | Ahmed | G06F 9/4881 |
| 2018/0336356 A1* | 11/2018 | Papaxenopoulos | G06F 8/65 |
| 2019/0005241 A1* | 1/2019 | Boutnaru | H04L 63/102 |
| 2019/0042742 A1* | 2/2019 | Matthews | G06F 21/53 |
| 2019/0114165 A1* | 4/2019 | Ghiondea | G06F 8/71 |
| 2019/0156025 A1* | 5/2019 | Wallace | G06F 21/54 |
| 2019/0303585 A1 | 10/2019 | Ofek et al. | |
| 2019/0370471 A1 | 12/2019 | Petratos et al. | |
| 2019/0377565 A1 | 12/2019 | Murthy | |
| 2019/0377867 A1 | 12/2019 | Murphy et al. | |
| 2019/0379705 A1* | 12/2019 | Murphy | H04L 63/0263 |
| 2020/0050773 A1* | 2/2020 | Schroeder | H04L 63/1416 |
| 2020/0372129 A1* | 11/2020 | Gupta | G06F 9/3842 |
| 2021/0081578 A1* | 3/2021 | Zhang | H04L 9/085 |
| 2021/0083675 A1 | 3/2021 | Chandra et al. | |

OTHER PUBLICATIONS

International Search Report and Written Opinion for Application No. PCT/US2020/46643, dated Mar. 23, 2021.

* cited by examiner

```
#include <stdio.h>
include <string.h> void malicious() {
    printf("You overflowed successfully. GG\n");
    exit(0);
} int main() {
    char buf[5];
    memcpy(buf, "ffffffffffffff\xf0\x01\x01", 19);
    printf("This message should always print\n");
}
```

*FIG. 6*

COMPUTER SYSTEM WITH MOVING TARGET DEFENSES AGAINST VULNERABILITY ATTACKS

CROSS-REFERENCE TO RELATED APPLICATION

The present application is a continuation of U.S. application Ser. No. 16/546,850, filed Aug. 21, 2019. Application Ser. No. 16/546,850 claims priority to U.S. Application No. 62/720,489, filed Aug. 21, 2018. The disclosure of which is hereby incorporated herein by reference.

STATEMENT REGARDING FEDERALLY SPONSORED RESEARCH OR DEVELOPMENT

This invention was made with government support under contract HR0011-18-C-0019 awarded by the Defense Advanced Research Projects Agency (DARPA). The government has certain rights in the invention.

FIELD OF THE DISCLOSURE

The present disclosure relates generally to techniques for securing computer systems against attacks and, more particularly, to techniques using composable and layered information asset protections for securing computer systems against attacks.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Computer security faces a challenging environment: regardless of the system, attackers seemingly can always find vulnerabilities; and even if those vulnerabilities are fixed, attackers will search for ways around those protections. This "security arms race," as it is called, persists because despite the advances in formal verification of systems, the complexity of real-world hardware and software precludes the possibility of using provably secure design techniques, i.e., techniques that can prove a design cannot be attacked.

In an ideal world, hardware and software designers could harness powerful security analysis tools that would implement proofs for each vulnerability of concern, to show that for a particular system:

> For all<programs,inputs>,there exists no unprotected vulnerabilities

Unfortunately, this important step to create truly secure systems is only possible for highly constrained environments. For example, the Microsoft SLAM project, which originated back in the early 2000s, was able to perform formal analysis on Windows drivers for security. However, the analysis limited the proofs to a single subprogram (i.e., the device driver being checked) and the inputs were highly constrained, due to the stylistic nature of Windows drivers.

Given the immense and growing complexity of today's computing systems, the goal of securing general software and hardware remains unreachable by conventional security verification proofs. Moreover, when security proofs can be completed, they provide no defense against unrelated vulnerabilities that not expressed within the proofs, whether known or unknown. There is a need for smartly targeting defenses to thwart vulnerability attacks.

SUMMARY OF THE INVENTION

In contrast to conventional approaches, i.e., instead of attempting (and failing) to find every vulnerability of a system, the present application describes security techniques that create a formidable sequence of roadblocks between the attacker and the critical attack information assets (also termed herein "information assets") required to mount an attack.

The present techniques institute an ensemble of moving target defenses (also termed herein EMTDs), capable of protecting attack information assets with independently composable defenses.

These independently composable defenses may be information type specific, such that each information type that an attack might want to attack may have its own attack information asset protection. By using different attack information asset protections for different types of information an attacker must successfully overcome multiple different types of protections to reach each attack information asset type.

Moreover, these composable defenses may be implemented simultaneously providing simultaneous protection of all the different information types. That means that for an attacker to successfully reach each of the information types, the attacker would have to successfully overcome each of these composable defenses in one attack.

Further still, the composable defenses may be layered where at least one attack information asset is protected by more than one composable defense. That is, in some examples, each composable defense provides a different attack information asset protection, but some of the different attack information asset protections are designed to protect the same attack information asset. By layering at least some of the composable defenses, for an attacker to reach even one attack information asset type would require the attacker to successfully overcome multiple composable defenses.

Yet further still, one or more of the composable defenses can be changed at anytime during runtime, using a hardware-enabled mechanism termed "churning" or "churn" herein. Such composable layers provide moving target defenses for an attack information asset, where the moving target defense changes after each churn cycle. By changing one or more of the composable defenses, now for an attacker to be successful, the attack must not only overcome each of the layered composable defenses, but do so over a window of time controlled by the computer system. If the attacker has not successfully overcome the moving target defense before the churn cycle, the attacker must synthesize a new attack, because the underlying attack information asset(s) is protected by an ostensibly entirely newly configured composable defense the next churn cycle.

In some examples, we demonstrate the effectiveness of the EMTD technology using a prototype system (that we developed) on a RISC-V architecture that protects information used to perpetrate control-flow attacks. As we show in our experiments, EMTD protections i) provide a high level of protection for a broad array of control-flow attacks, ii) create a convenient framework to dynamically trade-off performance and security, and iii) show great potential to deliver increased protection for advanced future attacks.

In one aspect, a computer-implemented method of securing a computer system against unauthorized access from an unauthorized agent includes (1) assigning one or more attack information assets, stored in the computer system and targetable by an unauthorized agent to exploit a vulnerability of the computer system, as corresponding to one or more information domains including at least one of a code domain, a code pointer domain, a data object domain, a data object pointer domain, a relative distance between data objects domain, or an operation timing domain; and (2) for each information domain, protecting the one or more attack information assets assigned to the information domain using one or more composable moving target defense layers of protection each having a respective churn cycle and a corresponding respective churn rate, wherein protecting the attack information assets includes reconfiguring each respective churn cycle at the corresponding respective churn rate.

In another aspect, a computer-implemented method of securing a computer system against unauthorized access from an unauthorized agent includes (1) assigning one or more attack information assets, stored in the computer system and targetable by an unauthorized agent to exploit a vulnerability of the computer system, as one or more of information domains including at least one of a code domain, a code pointer domain, a data object domain, a data object pointer domain, a relative distance between data objects domain, or an execution timing domain; and (2) for each information domain, protecting the assigned one or more attack information assets using one or more composable moving target defense layers of protection, wherein at least one of the one or more composable moving target defense layers is a reconfigurable composable layer.

In yet another aspect, a computer-implemented method of securing a computer system against unauthorized access from an unauthorized agent includes (1) identifying one or more attack information assets targetable by an unauthorized agent to exploit a vulnerability of the computer system as corresponding to one or more information domains including at least one of a code domain, a code pointer domain, a data object domain, a data object pointer domain, a relative distance between data objects domain, or an execution timing domain; (2) defining one or more composable moving target defense layers of protection each configured to provide a respective attack information asset protection; (3) ensembling the one or more composable moving target defense layers to simultaneously protect the attack information assets against vulnerability of the computer system; (4) reconfiguring the ensembled one or more composable moving target defense layers at a churn rate such that the vulnerability of the computer system is changed each churn cycle; and (5) layering the ensembled one or more composable moving target defense layers such as at least two composable moving target defense layers protect a same information domain.

BRIEF DESCRIPTION OF THE DRAWINGS

For a more complete understanding of the disclosure, reference should be made to the following detailed description and accompanying drawing figures, in which like reference numerals identify like elements in the figures, and in which:

FIG. 6 illustrates a buffer overflow attack for a RISC-V architecture.

DETAILED DESCRIPTION

The present techniques institute an ensemble of moving target defenses (also termed herein EMTDs), capable of protecting attack information assets with independently composable defenses. Attack information assets refers to a subset of information assets in a computer system that are needed by an attacker to be successful, such as pointers and code. The composable defenses may include moving target defense layers that they can be made to change at a desired rate. Further, those composable defenses may be layered, such that an attack information asset may be protected by multiple composable defenses.

Figure 1:
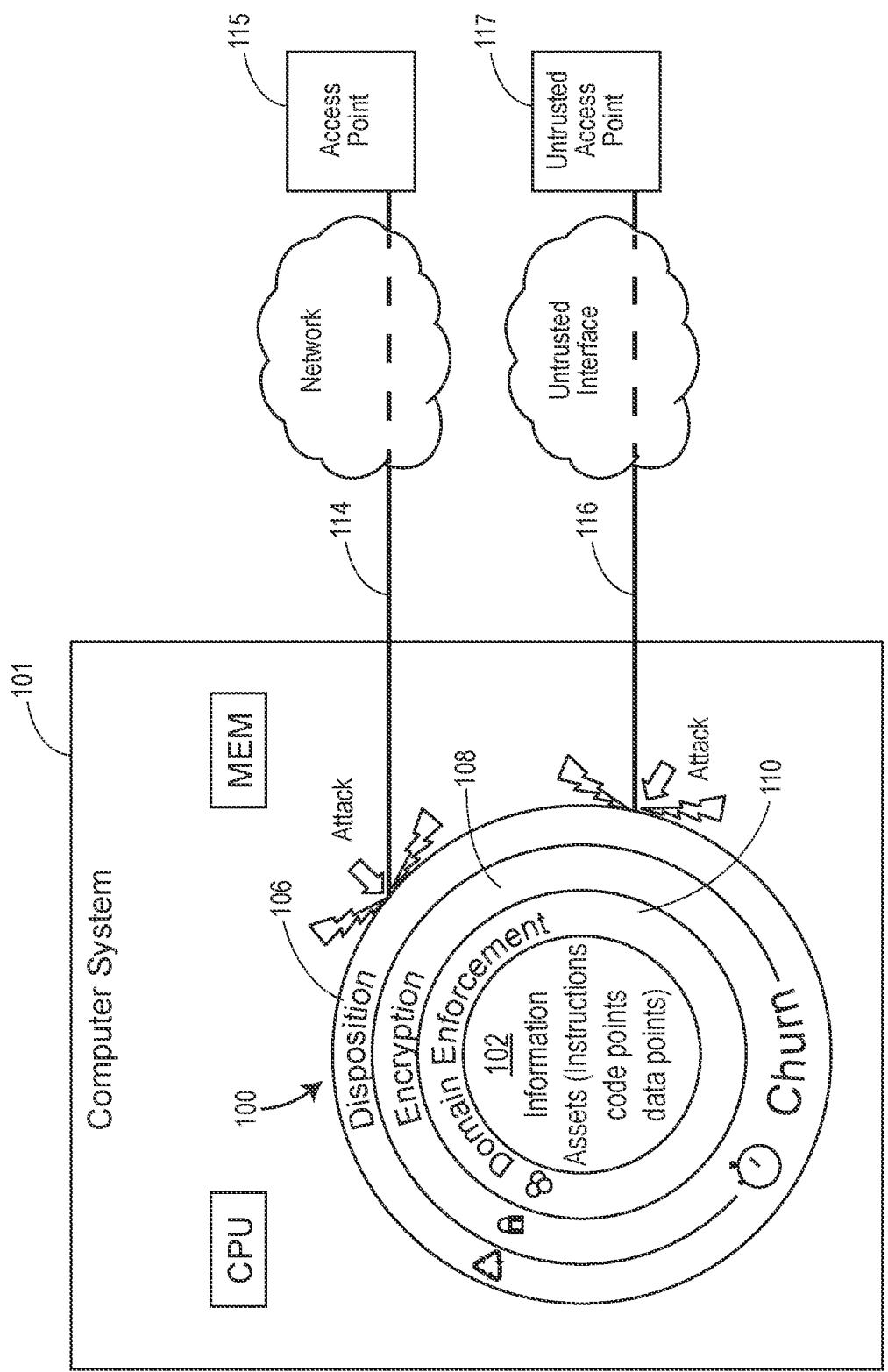
FIG. 1 illustrates an example ensemble moving target defense (EMTD) architecture for a computer system, in accordance with an example. The EMTD architecture protects the computer system against attack, for example, by requiring an attacker penetrate all composable protection layers of the EMTD architecture, acquire the information needed for an attack (e.g., code and pointers), and deploy the attack, while completing these actions before protection one or more of the composable protection layers are churned.

FIG. 1 illustrates an example ensemble of moving target defenses (EMTDs) architecture 100 that may be implemented for a computer system 101. The EMTD architecture 100 protects attack information assets 102 necessary to mount an attack. These assets 102 may span all aspects of information on the computer system, including executable instructions, code pointers, data pointers, and so on. In the architecture 100, any attack 104 that requires the use of any protected attack information asset in the assets 102 must first penetrate each of a plurality of composable layers of defenses 106, 108, and 110 to acquire the information necessary to synthesize a successful attack. For example, a return-oriented programming attack, where existing code is re-purposed to form a new attack code sequence, would require knowledge of the program's code, code pointer values, stack pointer value, and so on within the assets 102.

Figure 7:
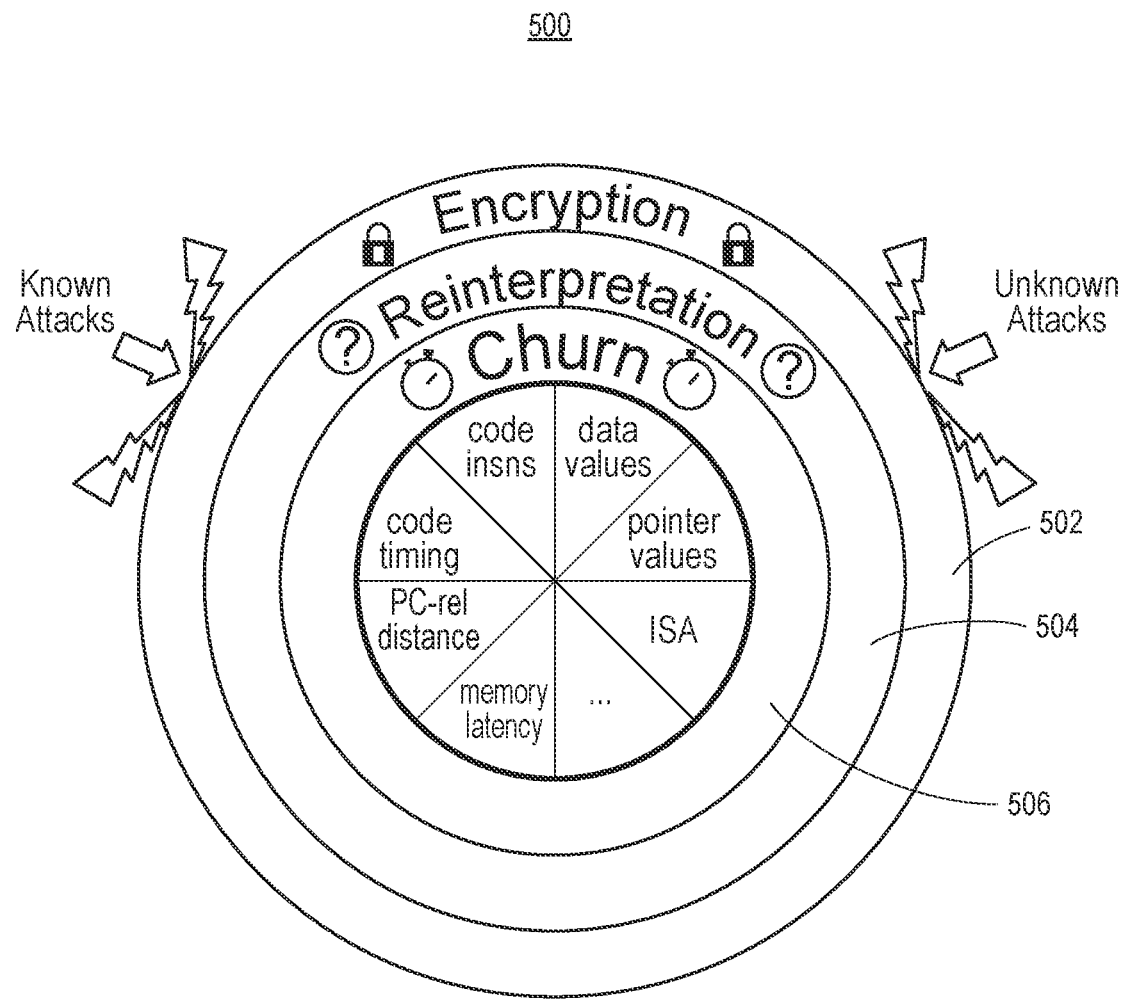
FIG. 7 illustrates an example moving target defenses (EMTD) architecture, in accordance with another example different from that of FIG. 1.

In the architecture 100, multiple composable defense layers 106, 108, and 110 of protections on attack information assets 102 are provided, such that successful penetration of one protection layer is met with yet another distinct layer of information protection. The number and type of composable layers may vary depending on the EMTD architecture, the type of computer system(s) being protected, whether the system is centralized or distributed, the number of processing cores, the number of processing accelerators, the types of attack information assets, the type of attacks that one anticipates against a system, etc. FIG. 7, discussed further below, for example illustrates another example EMTD architecture having an additional composable layer.

In the example of FIG. 1, the architecture 100 employs three different types of composable layers: a utilize runtime domain enforcement layer 110, a code and pointer encryption layer 108, and code pointer disposition layer 106. For example, the return addresses on the stack belong to a specific domain (i.e., code pointer), on which only a limited number of legal operations are allowed (runtime domain enforcement), program code is encrypted (encryption), and the code segment is placed at a random-selected offset (disposition). The type of composable layers and the number of composable layers may vary. In some examples, the composable layers may be chosen based on attack information asset type. In some examples, the composable layers are chosen such that each composable layer is configured to address a different type of attack. The code pointer disposition layer 106, for example, may be chosen as a composable layer capable of defending against control-flow attacks. In any event, a plurality of composable layers may be used. The three in architecture 100 are by way of example.

In some examples of the architecture 100, one or more of the composable layers is a moving target defense layer. For example, the code and pointer encryption layer 108 may be a first moving target defense layer, and the code pointer disposition layer 106 may be a second moving target defense layer. As a moving target defense layer, the composable layer is made to change over time, a process we term churning. Churning involves changing the state of the moving target defense layer in a manner that is detangled from the previous state, such that any attack on the layer must be started anew after churning if attempting to be successful. The churning is layer dependent such that different layers may churn in different ways. Furthermore, for multiple composable layers, each layer may have the same churn rate or a different churn rate, the later adding additional flexibility in providing security against attacks.

In an example, churning the code and pointer encryption layer 108 may include changing encryption and decryption keys used by the layer 108 each churn cycle. Any attack information assets protected by the layer 108 using a first encryption and decryption key will see the computer system 101 change that corresponding encryption and decryption key each church cycle. The churning by the code pointer disposition layer 106, by contrast, may involve displacing the protected attack information assets using a first displacement vector, and then changing the value of that displacement vector the next churn cycle for the layer 106.

Churning happens at a churn rate that establishes the beginning of each new churn cycle. The churn rates provide a strict upper bound on the time the attacker is allowed to penetrate all composable layers of protections. An attacker would have to gather the attack information assets necessary to synthesize an attack and deploy the attack within the upper time bound, in order to be successful. The churn rate determines the upper bound of that attack time, and setting churn rates at fast enough times, an attacker will not be able to synthesize and deploy an attack.

In the architecture 100, each composable layer 106-110 has the same churn rate. In other configurations, one or more composable layers may have different churn rates. Typically, churn rates are set to short upper bound times by using fast churn rates (and accordingly higher overheads).

The churn rate may be determined based on a number of factors, including, by way of example, the specific types of attacks, human-initiated attacks, machine-initiated attacks, network latency, or any combination thereof. For example, if a network-facing application's round-trip network latency to a potential attacker is greater than the churn period, the attacker cannot synthesize attacks fast enough, because the time to acquire an attack information asset and act on it is greater than the churn period, i.e., time period after which the moving target defense layer protecting that attack information asset has changed. In the example of architecture 100, each of the layers 106, 108, and 110 may have a churn rate that is greater than a network latency 112 defined as a latency between the computer system 101 and a network link 114, for example, to a network access point 115.

Thus, the architecture 100 may employ composable layers that have churn rates that depend on connected network resources. Further still, in some examples, these churn rates may be determined based on the type of network. For example, the churn rate may be configured to be faster than the network latency of only an untrusted network link (or interface) 116 connected to an untrusted access point 117, making an attack over the untrusted link 116 impossible or very unlikely.

By way of example, churn rates may be set to a value from 10 mins to 1 min, 1 min to 100 ms, 1 ms to 100 ms for each composable layer. The churn rates may be preferably of a value from 1 ms to 10 ms or from 10 ms to 100 ms. Based on studies within the continental United States showing a millisecond of round-trip ping implies a separation of 36 miles, for a churn rate of 10 ms, an attacker must be within a 360 mile radius to even have a chance of attacking one composable layer of the EMTD architecture 100. The greater the number of composable layers, the faster the attacker would have to be to penetrate them. Moreover, given the latency of network infrastructure and interfaces, it would likely be the case that an EMTD-based system with a 1 ms or faster churn rate would be protected from even close-proximity physical attacks.

The present techniques are not limited to network attacks or remote attacks. The composable layers and churn rates for those layers may be chosen to thwart "local" attacks, such as attacks initiated from inside a computer system (e.g., from a thread or process executing on the computer). The composable layers and churn rates for those layers may be chosen to thwart "physical" attacks, such as attacks initiated at the I/O parts of a computer system.

The architecture 100 may be configured as a hardware-based protection of the computer system. For example, the attack information assets 102 may be stored in a main computer system, such as the computer system 101 having a MAIN CPU, as shown. The code executing the architecture 100 may be stored in a dedicated security processor ("SEC CPU") communicatively coupled to the MAIN CPU and executed under control of the MAIN CPU and/or the SEC CPU during runtime to define the composable layers, to assess and assign attack information assets, and perform the other operations herein. In other examples, the architecture 100 may be software-based and stored on the computer system 101 for executing by the computer system 101 during runtime.

The present techniques can provide a number of security defense advantages over conventional techniques. Protecting a broad set of attack information assets provides protection against a broad array of security attacks, because different attacks often utilize the same information, e.g., nearly all control-flow attacks require knowledge of the instruction set and data pointers. Furthermore, computer systems implementing techniques herein may tolerate some level of software vulnerabilities without security breach, because the underlying attack information assets are protected. Further, computer systems employing the present techniques may also tolerate hardware vulnerabilities without security breach concerns by using composable protection layers. Further still, the strength of the protections can be adjusted based on the number of composable layers and the churn rate for those layers. For example, architectures may be tailored to provide stronger protections for more advanced attacks, for example by requiring more attack information assets to be gathered, and leading to tighter time constraints on synthesizing attacks on protected computer systems. For example, stack overflow attacks form the basis for more modern return-oriented-programming attacks, with the latter attack requiring significantly more information about the program (e.g., code, code pointers, etc.). Further still, the techniques are able to secure hardware against future unknown attacks, which often require the same attack information assets as known attacks.

Example implementations of the three example composable layers of FIG. 1 are discussed in further detail.

The composable layer 110 is a runtime domain enforcement layer that assigns attack information assets to one or more information domains. The runtime domain enforcement layer may be used for enforcing acceptable program and instruction set semantics, like those defined by the RISC-V architecture and the C/C++ language, for example.

In an example, the layer 110 includes a set of rules (i.e., domain rules) for assigning attack information assets 102 as corresponding to one of a plurality of information domains. Those information domains may include a code domain, a code pointer domain, a data object domain, a data object pointer domain, a relative distance between data objects domain, and an execution timing domain. In addition to assigning attack information assets to these different domains, each domain may include domain rules regarding the handling of code and data within a program. The domain rules may be configured based on the type of rules that already exist in a compiler, but because the information is discarded at runtime, malicious code can easily circumvent compiler rules. For example, a data pointer should never be an operand to an indirect jump—a correct program would never attempt this action—yet this capability is often critical for many control-flow attacks.

To gauge what runtime domain enforcement is necessary to stem control-flow attacks, we examined the most common control-flow and code injection attacks (see, Table 5 below), and determined that, in at least one implementation, for the architecture 100 to significantly reduce the possibility of control-flow attacks, the layer 110 should include rules for three program domains, code, code pointers, and data pointers.

To implement a runtime domain enforcement layer in an example, domain information was reintroduced into the program. To this end, in an example, we augmented the RISC-V architecture of the computer system 101 with a metadata tagging infrastructure composed of three components: tagged storage (including registers and memory), tag policy checking, and tag propagation.

In an example, tag storage implemented a 2-bit tag for every 64-bit word in the system, where the four tags, representing four information domains, were: code (C), code pointer (CP), data pointer (DP), and other data (D). As such, only 2-bits were used to encode this domain information. Of course, the bit size of the tag storage may vary depending on the application.

In an example, the tagged storage also included runtime metadata tagging, by adding a 2-bit tag to each register, plus 2-bits for each 64-bit aligned word of memory. The runtime domain enforcement layer 110 is able to use 2-bits per 64-bit word, in this example, because pointers in RISC-V are 64-bits in size. Additionally, the tagging infrastructure of the runtime domain enforcement layer 110 was configured to make all code segments an even number of instructions aligned to a 64-bit boundary; this requirement is implemented in the RISC-V linker with minimal NOP padding, and it results in every 64-bit location in the code segment containing two 32-bit RISC-V instructions. A compiler for the architecture 100 may be used to generate the initial values for metadata tags for code and pointers.

In some examples, the metadata tagging rules support domain-based tag propagation and policy enforcement. Table 1, for example, lists rules associated with each of the four information domain tags: code (C), code pointer (CP), data pointer (DP), and other data (D). For instance, code cannot be propagated under any circumstance; it can only be fetched for execution. Code pointers, on the other hand, can be copied, but they cannot be an operand to an arithmetic operation. In fact, all that can be done with a code pointer is copying it to a register or memory location, or use it as a target of an indirect jump or return. Data pointers allow a broader array of operations, but they still cannot, for example, be summed together or used as an operand for an indirect jump or return. These are example domain rules that may be executed by the domain enforcement layer 110. When a domain enforcement policy is violated, the program is terminated and a system-level exception is raised. Only code that runs in a trusted and privileged mode may violate these policies (e.g., the program loader).

TABLE 1

Runtime Domain Enforcement Rules.
This table details the semantics enforced by the domain enforcement defense,
which is used to protect code (C), code pointers (CP), and data pointers (DP).

| Tag Type | Propagation Rule(s) | Checking Policy |
| --- | --- | --- |
| Code (C) | Cannot be propagated | Only fetched |
| Code Pointers (CP) | Can't be loaded/stored | Only RET/JMP operand |
| | Can be MOV'ed between regs | |
| | Written to dest of JALR | |
| Data Pointers (DP) | DP +/− D = DP, D +/− DP = DP | Can be single ADD/SUB op |
| | DP − DP = D | DP − DP allowed |
| | Can be loaded/stored | Can be a base reg op |
| | Can be MOV'ed between regs | |
| Data (D) | D <op> D = D | Not base reg op, RET/JMP/JALR op |

Code and Pointer Encryption: The architecture 100 provides an additional layer of protection that prevents the inspection of code and pointer values through the code and pointer encryption layer 108. In an example, the code and pointer encryption layer 108 is configured such that all code, code pointers, and data pointers are encrypted. In some examples, each of these different information domains (code, code pointers, data, and data pointers) may be encrypted with a different domain key by the composable layer 108. By keeping all domains under their own encryption key, the computational burden of acquiring a broad set of attack information is significantly increased by the layer 108. Moreover, if a vulnerability is exposed in the runtime domain enforcement layer 110, it is still not possible to mix values obtained over the layer 110 between domains, as those values would be encrypted with one key and decrypted with another, thereby creating essentially a random value.

The composable layers may be entirely independent of one another, e.g., using different implementations and being individually controlled by the SEC CPU or MAIN CPU. By complete independence, if one of the layers is subverted by an attack, the remaining layers are still in force to stop the attacker.

In other examples, however, one or more composable layers may be interdependent. For example, the SEC CPU may share information between multiple composable layers during runtime operation.

The composable layer 108 is as example protection for multiple different information domains. The number of information domains protected by a composable layer may vary, of course. For example, for reasons of efficiency and simplicity, in some examples, the layer 108 may not encrypt non-pointer data values. Note that having a single information domain unencrypted still maintains strong inter-domain isolation, since if a data value were forged into a pointer, its plaintext value would be decrypted by the associated pointer encryption key before use, again creating essentially a random value.

Figure 2:
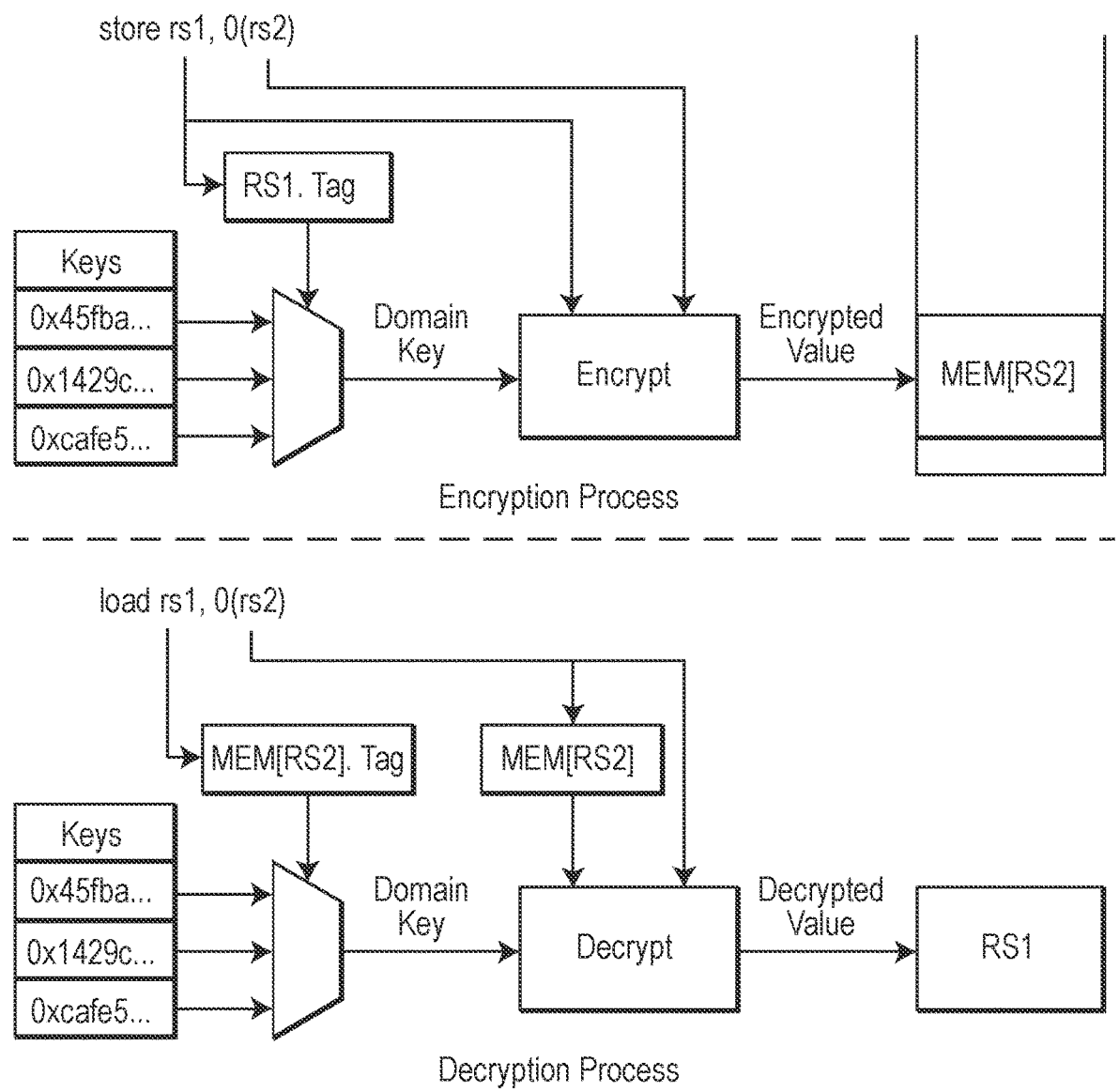
FIG. 2 illustrates an example composable layer in the form of an Encryption Layer. All code, code pointers and data pointers are encrypted in memory under their own domain encryption key. Using the metadata tags associated with registers and memory, the appropriate domain key is used to a) encrypt store values or b) decrypt load values. In addition, addresses are utilized as key components to deter copy-based attacks.

FIG. 2 illustrates an example encryption configuration 200 for the composable encryption layer 108. Storing and loading operations are described.

For encrypting stored data values, for example, a register value to be stored uses its tag value to pick the correct encryption key from an internal protected key storage. In an example hardware-based system, such key storage may be on a dedicated security integrated circuit. The value to be stored from register rs1 is then encrypted, using the key and the effective address in rs2. Note that the use of the effective address as a key component prevents copy-based attacks that swap memory locations without decrypting their values.

With the effective address incorporated into the cipher, swapping two memory values would result in the wrong address being used for the decryption, resulting in an incorrect random output. For decrypting load values, the tag for a stored value from memory is used to pick the correct decryption key. The stored value is then decrypted using the key, and the decrypted value is provided to register rs1.

While resilient to copy-based attacks, the address-based key component configuration of FIG. 2 may not be as powerful as a true nonce, such as the protected counters used in the Merkle integrity enforcement trees of the Intel SGX encryption system. A true nonce is not reused, thus it can also protect a single storage location from a replay attack, where an attacker may attempt to copy an old encrypted value into a storage location. However, that the address quasi-nonce approach of configuration 200 is significantly less complex, more efficient, and with frequent churning it too can stop a memory replay attack, e.g., if the replay occurs after the encryption key is churned, the replay attack will fail. As such, the encryption layer 108 offers a more efficient security option than conventional encryption approaches.

In some examples, the code and pointer encryption protection layer 108 is implemented as a moving target defense layer. That is, the layer 108 supports continuous runtime churn, such that the key of any information domain (e.g., data, code, and pointers) may be changed while a program is running. In some examples, this runtime goal can be achieved by having the churn mechanism use i) precise knowledge of the location of all code and pointers, and ii) the ability to re-encrypt values under the program without impeding execution. In some examples, locating all of the code and pointers is achieved using runtime domain enforcement metadata. For example, the churn mechanism may examine the metadata storage, locating the values to be re-encrypted. To allow this process to proceed in tandem with program execution, the encryption protection may introduce a threshold register and an alternate encryption key for each domain. When re-encryption commences, memory is re-encrypted in an incremental fashion. Progress is marked in a threshold register, and as such, all memory below that address is decrypted with the new key, all memory above is decrypted with the old key. Further examples are described in reference to FIG. 4 below, showing encryption functions within the context of an example microarchitecture. To ensure that the keys are not compromised, the keys may be held in internal processor registers, only writable by trusted and privileged code and only readable by the cipher engine and the process' context-switch mechanism.

The disposition layer 106 is another example composable layer, this one designed to protect pointers essential to implement security attacks (i.e., one of the types attack information asset). The layer 106 provides a powerful mechanism designed to dispose of an attack information asset, such that, even if an attacker acquired an attack information asset, the asset would be no longer useful once the disposition churn mechanism for layer 106 is invoked. In an example, disposition is repeatedly applied to code pointers at runtime. This has the effect of continuously changing the value of all code pointers in the program as the program runs. As such, the return addresses, the location of virtual memories, entry points of functions, etc., are continuously changing. Thus, if an attacker has somehow acquired a useful code pointer value, they must initiate their attack before the next code pointer disposition churn event, or they will not jump to the correct code location. This has the effect of severely limiting the time over which an attacker can acquire the information necessary for an attack, since a significant fraction of control-flow attacks today requires some knowledge of code pointers.

Figure 3A:
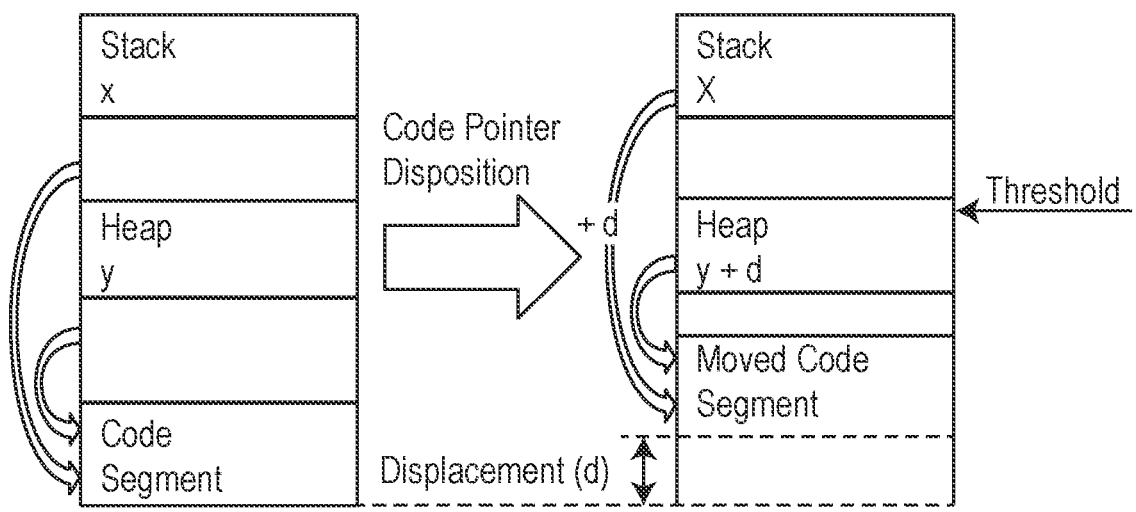
FIG. 3A illustrates another example composable layer in the form of a code pointer disposition layer. In example, during code pointer disposition, a code segment is shifted by a random displacement, d; then all the code pointers in the program are updated with their new displaced value. The threshold register permits code pointer updates to occur incrementally. Disposition has the desirable effect of destroying the value of any code pointers that may have leaked out of the system.

FIG. 3A illustrates an example of implementation of code pointer disposition that may be applied by the composable layer 106. When invoked, an entire code segment is moved by a random displacement d. Instantly, all code pointers in the program are stale, as they are incorrect by an offset of d. A similar mechanism could, for example, be applied to other types of pointers, including data pointers, return pointers, etc.

The layer 106 may be configured as a moving target defense layer. The moving target nature of the layer 106 may be achieved in a number of ways. For example, the layer 106 may continuously rewrite information domains during a churn cycle. For example, each churn cycle, the layer 106 may begin rewriting all code pointers, from low memory to high, until all code pointers have been updated. While this process of updating code pointers proceeds, a program is still running and the threshold register (shown in FIG. 3A) indicates up to which location in memory code pointers have been updated. If a code pointer is used from above the threshold location, the layer 106 may automatically apply the necessary fix to the value (by adding d to the code pointer value), such that the program continues to operate correctly.

Once the threshold location reaches the top of virtual memory, all of the code pointers within the program have been successfully disposed, i.e., all code pointers that an attacker may have acquired earlier are no longer useful. Once the layer 106 completes code pointer disposition, the computer system 101 can initiate code pointer disposition again immediately, or the computer system 101 can delay it until any security-performance trade-offs applied by the computer system 101 are met. This represents another way the layer 106 provides moving target defenses, i.e., the churn process starts over again each churn cycle. To improve efficiency, in some examples, the configuration 100 may shift code without actually physically copying it, as discussed in reference to FIG. 4.

Figure 3B:
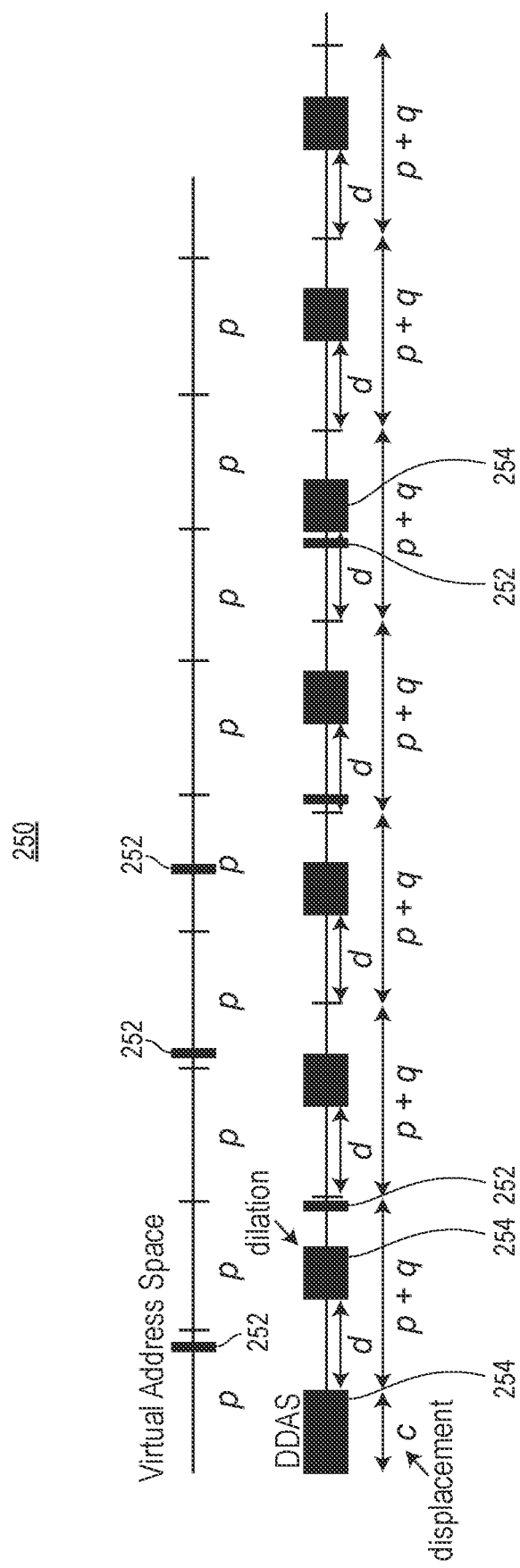
FIG. 3B illustrates another example implementation of a disposition composable layer.

FIG. 3B illustrates another example implementation 250 of a disposition by a composable layer. The goals for this implementation are to stop copy-based attack (e.g., memcpy( ) off the end of an array), dispose of relative distances (e.g., #bytes from fn A to fn B, var X to var Y) with a churning process, and avoid destroying natural program localities. For this implementation, all program pointers used a displaced and dilated address space (DDAS). All caches and memory used a virtual address space (VAS). A null space 252 was added after all (sub)variables in the address space and additional null space is inserted at randomly selected intervals in the address space. Displacement and dilation of addresses with null space 254 were used, with random p, q, c. No null accesses were allowed, i.e., the metadata type associated with a null space indicates a security error if the storage is ever read or written. In this pointer disposition implementation, the address space may be displaced and also dilated. While the displacement serves to dispose of all pointer values, the dilation of the address serves to change the relative distance between objects, which is an emerging information asset used in recent security attacks.

Figure 4:
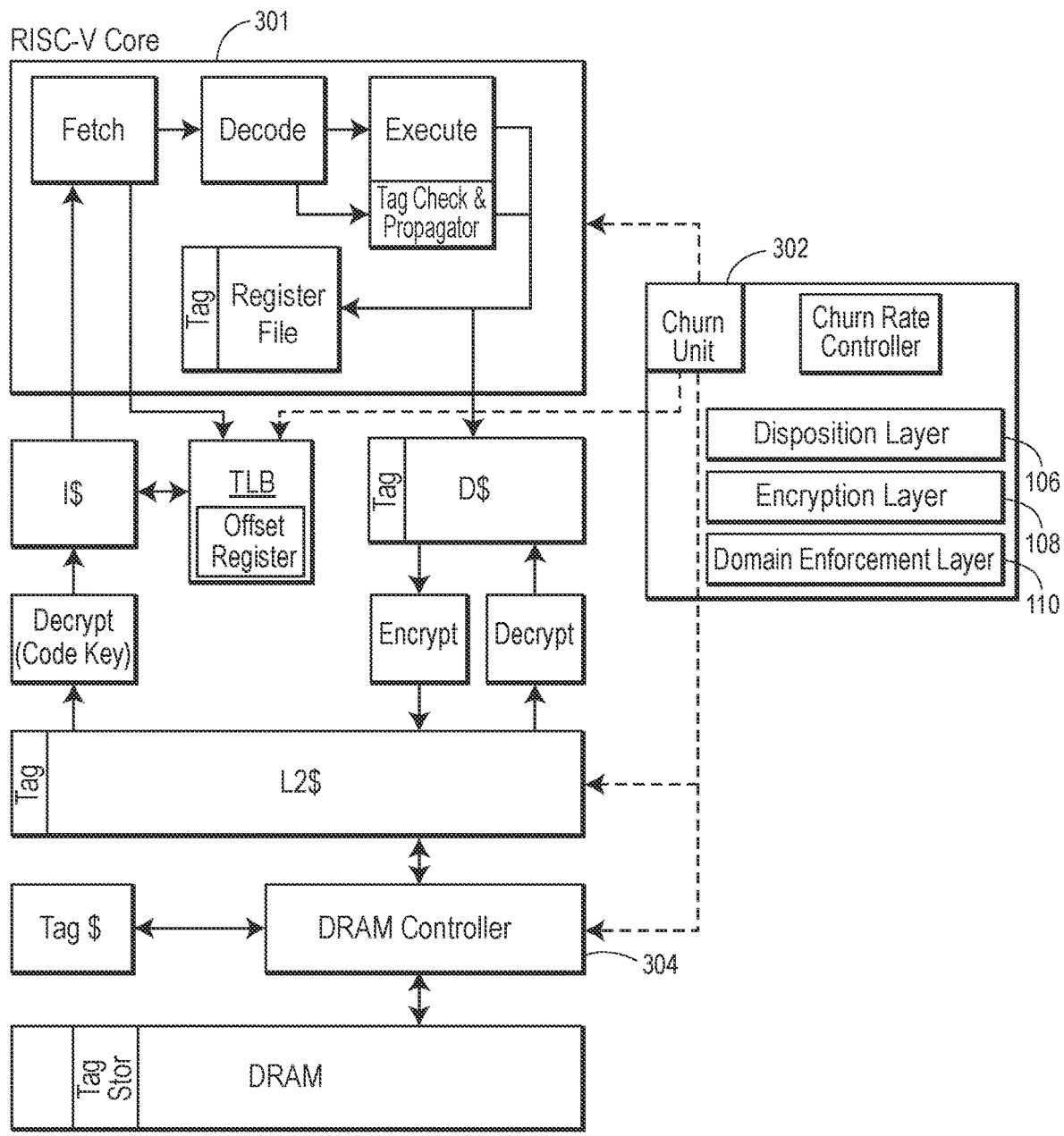
FIG. 4 illustrates an example microarchitecture for implementing EMTD protections with churn rates targeted at stopping all forms of control-flow attacks. The components hashed with light blue stripes are those that augment the baseline RISC-V system to support EMTD protections.

FIG. 4 illustrates an example microarchitecture 300 for a RISC-V configuration implementing a composable layer protection architecture (e.g., providing EMTD protections) like that of architecture 100. The microarchitecture 300 may be implemented as a dedicated security controller (e.g., microprocessor or integrated circuit), such as the SEC CPU, for protecting a computer system having a main processor (e.g., MAIN CPU) and functional components coupled to the microarchitecture 300.

A churn unit controller 302 is communicatively coupled to the RISC-V core 301. The churn unit controller 302 contains the composable layers 106, 108, and 110 and further includes a churn rate controller that controls the churn rate for any of these layers implemented as a moving target defense layer. The number and type of composable layers are provided by way of illustration and may be different in different configurations of the controller 302 and for different computer systems and for different protections objectives.

In the illustrated example, the churn unit controller 302 is communicatively coupled to a translation look-aside buffer (TLB), the L2$ cache, and a DRAM controller 304. The components showing the hashed striped shading are those that augment the baseline RISC-V system to support the EMTD protections described herein.

In the microarchitecture 300, the churn unit controller 302 communicates with the RISC-V core 301 and connected processes to efficiently manage metadata tag information attached to storage and propagated through the processor pipeline, e.g., using the domain enforcement layer 110. Additionally, the churn unit controller 302 controls efficiently implementing intra-program domain encryption, using the encryption layer 108 and supports the code relocation and code pointer update operations required for disposition protections, using the disposition layer 106.

The churn unit controller 302 is responsible for re-keying the domain encryption and pointer disposition protections, while software continues to run protected. For domain encryption, the churn unit controller 302 re-encrypts all code and data under the new domain-specific keys. For pointer disposition, the churn unit controller 302 updates the address space displacement, and then fixes up all of the pointers in the program, since they now point to the wrong address (i.e., the latest displacement d must be added to all pointers).

Example processing operations of the churn unit controller 302 are listed below, for re-keying the encryption and pointer disposition protections, while minimizing storage copies and pipeline stalls:

When churning begins, a fetch unit is stalled to allow pending stores to complete. This drains out any pointers it might be utilizing. Since the registers are not encrypted or displaced, the churn unit need not access them.

To implement pointer disposition, an offset register integrated with the TLB is updated with the cumulative shift in the virtual address space (i.e., d is added to its current value).

When instruction fetch resumes, this offset is first subtracted from the virtual address coming into the TLB before attempting a virtual-to-physical address translation.

Before execution resumes, the program counter is updated (i.e., d is added to it) to the new, displaced address.

To implement domain encryption, the churn unit controller 302 may issue reads to the encrypted L2-cache, using the cache coherent interfaces of the main core cache bus. All of the data that is tagged as an encrypted domain (e.g., code, code pointers, and data pointers), is read (and made coherent) into the L2-cache and re-encrypted. Since the underlying data is not changed, the re-encryption operations need not invalidate the L1-cache or be coherent with the registers or pipeline latch values, however, the churn unit's write cycles are perceived atomic by the main core.

The churn unit controller 302 maintains a threshold address, such that below the threshold, all storage has been updated as per the re-keying of the protections. Thus, when the main core accesses a location below the threshold, the protections utilize the new key; otherwise, the previous key is used. Once all of memory is updated, all old keys are destroyed.

Tag Storage, Propagation, and Verification. In the example of FIG. 4, the churn unit controller 302, e.g., through the domain enforcement layer 110, identifies attack information assets needed for attack and identifies the attack information assets as belonging to one of an information domain. Those attack information assets in the various information domains are tagged by the domain enforcement layer 110.

A tag storage mechanism dedicates a portion of the DRAM to store tags (labeled the Tag Store) for the information domains. The tags indicate that a single memory block (which may be 64 bytes) uses a 16-bit tag, thus 1/32 of memory is dedicated to tag storage. The 16-bit tags are concatenated with the 64-byte memory block in the memory controller and returned to the caches. The tag information may be located at an offset of tagstart+phyaddr/32, where tagstart is the location of the tags in DRAM. Tags are associated with physical addresses, which eliminates the complexity of storing tags for multiple partially allocated virtual address spaces; it also simplifies the handling of tags for shared memory. Concentrating DRAM tags into the fixed location in DRAM (rather than extending the DRAM geometry to 66-byte blocks) also simplifies the churning process of the churn unit 302, since specific domain types (e.g., code pointers) can be efficiently located by scanning dedicated tag storage memory.

In operation, the DRAM controller 304, in response to the churn unit controller 302, automatically fetches the tags associated with a particular data block (i.e., a particular information domain) and assembles the cache block data with the tags. The cache blocks are extended to store the additional metadata tag bits with each block. This organization simplifies tag management in the CPU and cache hierarchy as the same read transaction that fetches the data also fetches the metadata tag bits. Even if a single cache line requires just 16 tag bits, tags are read from DRAM at a 64-byte block granularity (reading sizes other than 64-bytes would require changes to the standard DRAM modules). These 64-byte tag groups are cached in a dedicated tag cache, and the DRAM controller 304 looks-up tags in the tag cache before attempting to fetch them from DRAM.

Encryption Algorithm Implementation. In the microarchitecture 300, the encryption layer 108 applies an encryption algorithm, such as a QARMA block cipher. While any number of encryption algorithms may be deployed, for illustrated example, this cipher was chosen because it offers a low-overhead cryptographic algorithm that supports the use of nonce values to remove correlation between two identical storage locations. It achieves this by combining a 128-bit encryption key with the 64-bit memory block address in the encryption and decryption process.

Using an open-source implementation of QARMA7-64-σ1, we were able to achieve an encryption latency of 2-cycles, which was desirable for minimizing performance impacts, since encryption and decryption latencies are partially exposed on the fetch, load and store datapaths. As shown in FIG. 4, the microarchitecture 300 encrypts all domains until code and data are placed into the unencrypted L1 caches. In the illustrated example, the I$ and D$ are the L1 instruction and data caches, respectively. Whether or not to encrypt the L1 caches is a performance-vs-security decision, and either design is possible. In the illustrated example, we chose not to encrypt the L1 caches, but if the added latency of accessing the L1 caches (due to decryption) were acceptable, additional security would be had with a fully encrypted L1 cache. As an example of great security, if the domain enforcement mechanisms were somehow subverted by an attacker, the attacker would still not be able to convert data pointers to code pointers in the L1 cache (as is necessary for a buffer overflow attack) because these two program data types would be encrypted under different encryption keys.

For the illustrated example, the encryption layer 106 was configured to not encrypt the L1 caches to improve system performance, since encryption and decryption latency is only exposed on the L2 miss datapath. Since the L1 data cache cannot be easily inspected with physical attacks and because the runtime enforcement of layer 110 prevents the mixing of code and pointers, this configuration decision significantly improves performance with negligible impacts on security. While the L1 caches are unencrypted, information domain tag information is still propagated up into the L1 data cache. The L1 instruction cache, however, does not contain tags since all values in the cache must be code; the tags are checked to be of type "code" when misses to the L1 I-cache occur. If an attacker attempts to inject code into the system by jumping to data, the code tag check on the I-cache miss will fail and the attack will not succeed.

Shifting the Code Segment. The disposition layer 106 repeatedly code segments to a new virtual address to destroy the validity of any leaked code pointers. However, it is not necessary to change the physical address of code while shifting the virtual address space, thus avoiding the potentially high penalty of copying data in the caches and DRAM.

Additionally, to avoid sudden slowdowns during the churn process, churn operations can proceed in tandem with live program execution. Steps detailing an example shift of the entire code section by d bytes, while minimizing storage copies and main program stalls, as performed by the disposition layer 106, are described below.

Step 1: When the code space is relocated, a fetch unit within the RISC-V core 301 is stalled to allow pending instructions to complete. This drains out any code pointers the RISC-V core 301 might be utilizing.

Step 2: An offset register, integrated with the TLB, is updated with the cumulative shift (i.e., d is added to its current value) in the virtual address space. When instruction fetch resumes, this offset is first subtracted from the virtual address coming into the TLB before attempting a virtual-to-physical address translation.

Step 3: Similarly, before execution resumes, the program counter is updated (i.e., d is added to it) to continue fetching from the new, shifted address.

Step 4: After these fix-up procedures, the example RISC-V core 301 can resume execution. However, at this point in time, all code pointers that exist in memory are incorrect, since the offset d must be added to each code pointer. The next step involves updating the code pointers residing in memory, while the program resumes normal execution.

The memory tagging operations of the runtime domain enforcement layer 110 mark each code pointer in memory. These tags are stored in a dedicated physical location in DRAM, and the churn unit controller 302 scans these tags to locate code pointers and update their values to the new target addresses. A tags size may be just $1/32^{nd}$ of the active address space and can be scanned quickly. If the dedicated tag scan does become unwieldy, a two-level tagging scheme could also be used, making the amount of tag memory to be scanned significantly smaller than the size of the address space. When the churn unit controller 302 encounters a tag indicating a code pointer in memory, it sends an invalidation signal to the caches L1 and L2 and DRAM and fetches and updates the code pointer. The churn unit controller 302 does this without stalling program execution. However, as a program is executing, the program might attempt to access code pointers that are not yet updated by the churn unit controller 302. As detailed earlier, the threshold register allows the microarchitecture 300 to determine which code pointers have been updated and which need to be fixed-up in the pipeline. In some examples, the control logic for the churn unit 302 can be implemented in a small, programmable controller, which simplifies the implementation and incurs negligible hardware overhead.

Avoiding Bad Interactions with the VM System. In some implementations of the microarchitecture 300, we avoid moving data in the caches and DRAM when the code pointer disposition layer 106 relocates the code segment of a program. While this may be accomplished with physically indexed caches, most systems today utilize virtually indexed physically tagged caches. Therefore, in some examples, we can avoid moving any code by ensuring that the cache's virtual index bits for any instruction do not change when the code segment is relocated. For example, the churn unit 302 may be configured to move the code segment by an offset (positive or negative) that is a multiple of the cache set size. Another potential problem with virtual memory could occur when VM pages are released. While the churn unit 302 is scanning through the heap and stack, the program could potentially de-allocate a stack frame or munmap( ) portions of the heap. To ensure the churn unit controller 302 does not modify these de-allocated spaces, a trusted kernel module updates the address range that the churn unit 302 should scan for the current application.

In a virtual machine (VM) configuration, an LLVM-based compiler was used and included two mechanisms to perform metadata tagging. A first mechanism identified the domains of statically initialized objects. These objects are in the data segment (except the .bss segment) and the .text segment. The LLVM-based compiler had direct access to the domain information of statically initialized objects, because these objects contained initialized type data.

A second mechanism identified the domains of dynamic objects, namely objects in the stack and the heap, as well as objects in the .bss segment. To identify the domains of dynamic objects, the LLVM-based compiler first determines the instructions that initialize these objects, then the LLVM-based compiler infers the domain of the object using the semantics of the initializing instruction. For instance, after analyzing the RISC-V instruction LUI rx, hi(global_var), which loads the upper bytes of the address of global_var (i.e., a data pointer) to register rx, the compiler will unambiguously determine that rx's domain is that of a data pointer. Once the LLVM-based compiler performs the initial metadata tagging, the microarchitecture 300 is responsible for propagating the domain information as the program executes. Specifically, microarchitecture 300 propagates the tags of a source object to destination objects according to the metadata propagation rules in Table 1, above.

Figure 9:
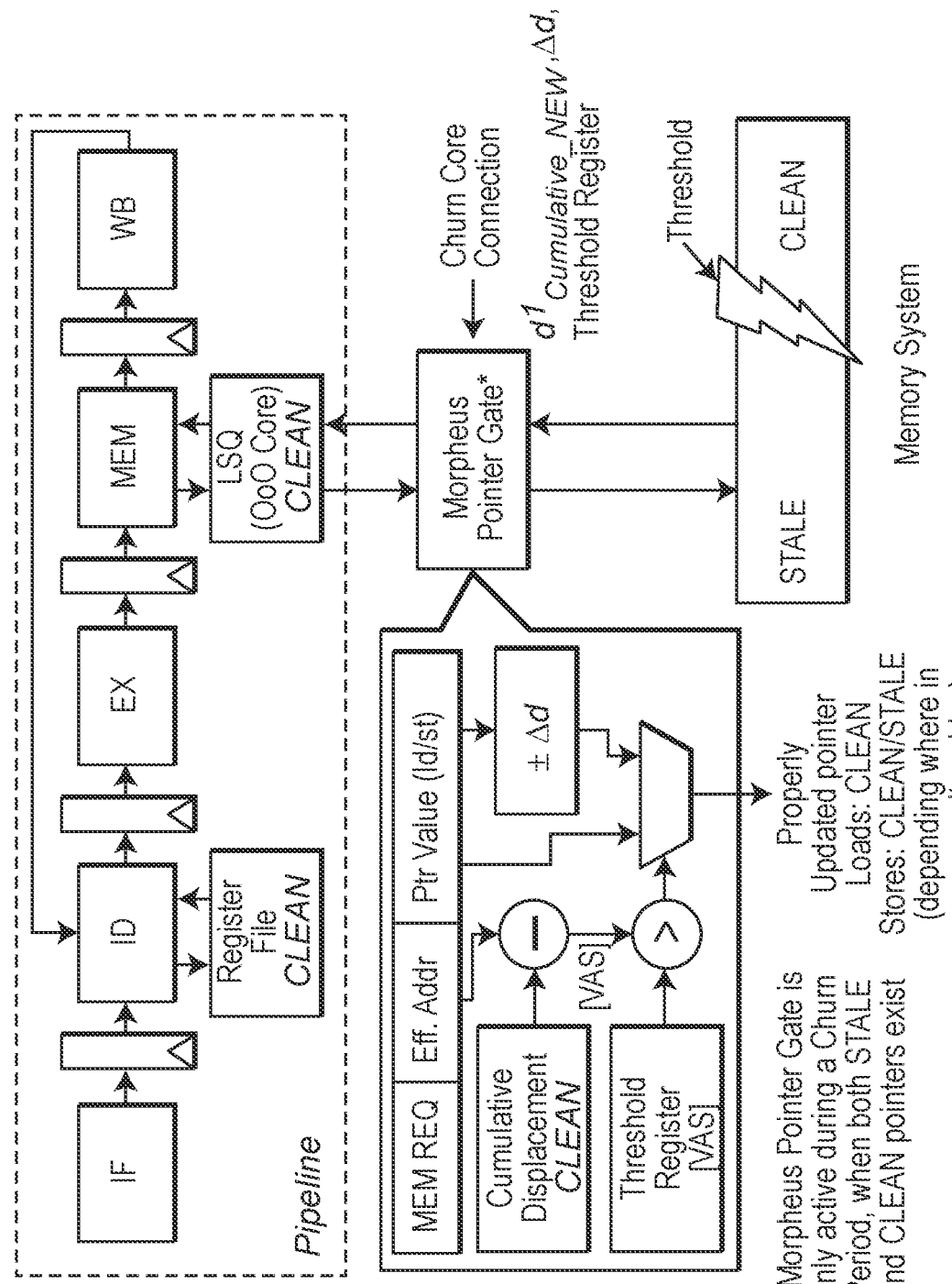
FIG. 9 illustrates an example implementation of a churn unit as may be implemented in the microarchitecture of FIG. 4.

FIG. 9 illustrates a detailed example of another example churn unit as may be used in the microarchitecture 300, in some examples. An instruction pipeline is shown having an instruction fetch (IF) block, that reads an instruction from memory, an instruction decode (ID) block, that reads source registers and generates control signals, an execute (EX) block that computers an R-type result or branch outcome, a memory (MEM) as reading and writing data memory, and a writeback (WB) block to store a result in a destination register. In any example, the pipeline is implemented as a MIPS pipeline. The MIPS pipeline is coupled to a block implementing aspects of the churn unit, and labeled "Morpheus Pointer Gate" expanded as shown. The resulting STALE (i.e., non-updated) pointers are shown in a memory along with CLEAN (i.e., newly churned) pointers which are above a threshold.

Example Performance Analysis

We detail below an example implementation of an EMTD-based microarchitecture (e.g., microarchitecture 300), in accordance with examples therein. We then analyze the performance of benchmarks running on this EMTD-based microarchitecture, analyzing the performance overheads of the EMTD protections including the overheads of churn. We then provide a security analysis of the EMTD-based microarchitecture, examining its ability to stop a wide range of control-flow attacks.

Figure 5:
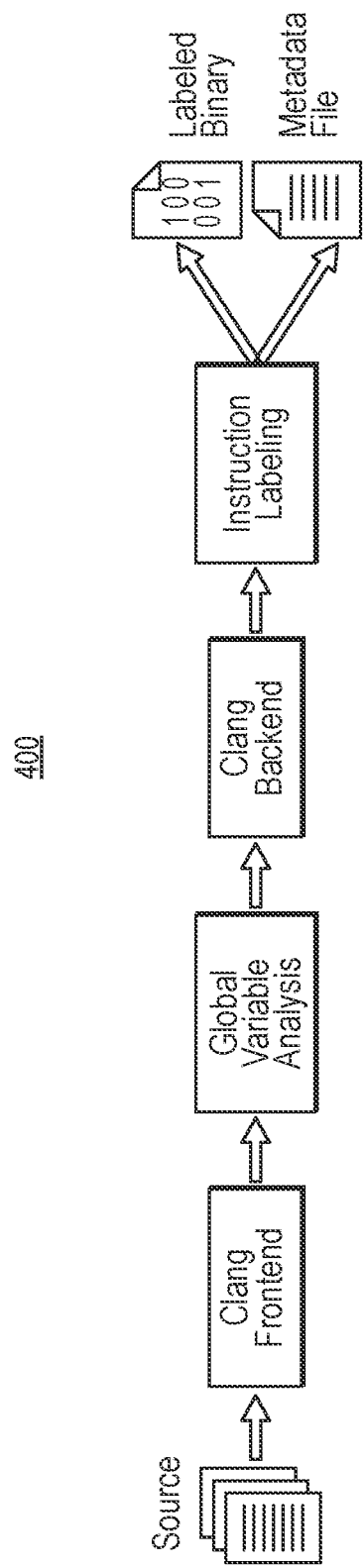
FIG. 5 illustrates an example LLVM-Based Compilation Process. The EMTD-enabled compilation chain is implemented as a multi-pass extension in the LLVM compiler. The extensions added determine the location of all code, code pointer, and data pointer objects in the executable. This initial metadata is used to initialize the tag store when the program is loaded for execution.

A LLVM framework was used to implement the compiler. FIG. 5 shows a compiler data flow process 400. The input to the compiler was unmodified C source files, which were converted into the LLVM intermediate representation by a compile frontend, e.g., a Clang frontend. Then a global information domain analysis was used to label each 64-bit memory object in statically initialized data sections as a data, code pointer, or data pointer. Subsequently, an instruction labeling stage at a Clang backend identified and labeled instructions that initialized dynamically initialized memory objects (i.e., objects on the stack and heap, as well as in the .bss segment). Finally, a Python-based parser extracted initial metadata from the labeled binary. The output of the compiler was a binary with labeled instructions and a metadata file that contained tags for memory objects.

Microarchitecture Implementation. To estimate the performance costs of using EMTDs on the microarchitecture 300, we implemented our EMTD prototype on the RISC-V port of the gem5 simulator. The RISC-V core 301 is built on top of the gem5 MinorCPU 4-stage in-order core. The tag checking and propagation was performed at the core's Execute stage, just before results are committed. This check was done in parallel with the rest of the operation of the core's functional units to minimize latency.

The encryption layer 108 was implemented by synthesizing an open-source implementation of QARMA7-64-σ1. This version of QARMA uses a block size of 64-bits and 7 rounds. The encryption layer 106 was synthesized using the 45 nm IBM SOI technology library. The encryption layer 108 adds a 4 ns latency (for a total of 2 cycles delay) when a line is brought into the L1 cache from the L2 cache, and vice-versa for decryption.

We used DRAMsim to model the memory system and assess the performance impact of tag scanning and churn mechanisms that drive code pointer disposition and domain encryption. Specifically, the churn unit 302 communicated between gem5 and DRAMsim to scan tags and to determine either the code pointers that need to be updated with a new offset, or the information that needs to be re-encrypted with a new key.

To examine the performance, we analyzed a number of benchmarks, as show in in Table 3. The qsort program sorts a large array of strings using quick sort; stringsearch searches for given words in sentences using case-insensitive match; sha is an implementation of the secure hash algorithm; adpcm implements a variation of the pulse code modulation method; crc32 performs a 32-bit cyclic redundancy check for a given file; fft performs a Fast Fourier Transform on an array of data; bitcount tests bit manipulation abilities of a processor; and basicmath performs simple mathematical calculations such as cubic function solving and integer square root. All of the benchmarks were run for 1B cycles, except for basicmath, which was run for 100 M cycles.

Table 3 shows the performance overhead for these benchmark applications with each of the multilayer EMTD protections (i.e., composable layers) enabled for three different example churn rates. From the table it can be seen that EMTD protections incur very little slowdown.

To assess the performance overheads of EMTD protections, we ran experiments on the gem5-based timing model with all EMTD-based protections engaged, i.e., runtime domain enforcement, code and pointer encryption, and code pointer disposition. We ran experiments with varied churn rates (10 ms, 20 ms and 50 ms), such that the churn re-runs after the specified churn period (in tandem with continued program execution) to perform the following steps: i) code pointer disposition is invoked, moving the code segment by a random shift that is a multiple of the cache set size, ii) code pointers are updated (concurrently) to reflect the new code location, iii) all code, code pointers, and data pointers are re-encrypted under a new random-chosen key. This process completes well within 10 ms for all programs, thus, the measured results indicate the full impact that these protections are having on the program's execution.

Table 3 shows the performance of benchmark applications running with an example of the full EMTD protections at different churn rates, which can be compared to the native program running without EMTD protections on the baseline architecture detailed in Table 2. The fastest software-based continuous address space layout randomization (ASLR) techniques have shuffle rates between 20-50 ms. At that churn rate, our performance overheads are negligible. Indeed, our overheads, due to our use of hardware support for runtime churn, are significantly lower, with churn overheads of no more than ≈0.2% with a 10 ms churn rate, in the illustrated example. This improved performance is attained despite having multiple protection layers in force, beyond that of any previous software-only based effort. Indeed, the present techniques are particularly promising, since with a 10 ms churn rate for example, the system would be impenetrable to remote attacks with a round-trip latency greater than 10 ms (corresponding to a physical distance of approximately 360 miles), since the attack information assets acquired would have expired or been re-encrypted before an attacker could utilize them.

TABLE 2

Morpheus Microarchitecture Configuration.
The table shows microarchitectural configurations for the measurements in Section 3.2. The first five rows list the configurations for the baseline microarchitecture. In addition to the baseline components, an additional 4 KB tag cache is used in the EMTD-enabled microarchitecture.

| Core Type | In-order Core |
|---|---|
| CPU Frequency | 1 GHz |
| L1 Instruction Cache Size | 32 KB |
| L1 Data Cache Size | 32 KB |
| L2 Unified Cache Size | 256 KB |
| Tag Cache Size | 4 KB |

TABLE 3

Performance Overhead.
The table shows the performance overhead for applications from the MiBench benchmark suite with all EMTD protection enabled for three churn rates. From the table it can be seen that EMTD protections incur very little slowdown.

| | Churn Rate | | |
|---|---|---|---|
| Program | 10 ms | 20 ms | 50 ms |
| qsort | 0.03% | −0.01% | −0.03% |
| stringsearch | −1.40% | −1.43% | −1.43% |
| sha | 0.02% | 0.01% | 0.00% |
| adpcm | 0.01% | 0.01% | 0.00% |
| crc32 | 0.01% | 0.00% | 0.00% |
| fft | 0.18% | 0.15% | 0.11% |
| bitcount | 0.00% | 0.00% | 0.00% |
| basicmath | 0.08% | 0.03% | 0.02% |

Surprisingly, benchmark applications qsort and stringsearch experienced modest speed-ups. This is due to the fact that our current implementation of the churn unit controller caches fetched pointers (in the CPU's L2 cache) and tags (in the tag cache), which has the beneficial effect of warming up the caches in a manner that benefits these two programs.

To better understand the reason for the low overheads, we analyzed the amount of work per churn on average for two programs: FFT (which in our experiments experienced the highest runtime overheads), and bitcount (which has relatively more code pointers). Table 4 lists the maximum number of instructions, code pointers, and data pointers encountered during a churn cycle for these two programs. We note that FFT has a relatively high heap size, compared to the other simulated programs (268 KB). As a result it takes slightly longer to scan the tags. However, since the tags are just $\frac{1}{32}^{nd}$ of the memory size, scanning the tags for this heap would only require 134 memory accesses—which typically would take 6.7 μs to read out of a DRAM (assuming a 50 ns average DRAM access latency). If a 2-level tagging scheme were employed instead, a single tag block access can fetch enough tags to check if 512 KBs of memory have any pointers in them—which makes pointer scanning scalable for much larger heaps. Further, we note that bitcount has a slightly higher number of code pointers, compared to the other programs we simulated. Shifting address spaces and re-encrypting instruction both require reading and modifying code pointers. However, once code pointers are located in memory (via tag scans), only two memory accesses are required to update each pointer. While bitcount has more code pointers, their count is still modest, thus, an increased number of code pointers does not adversely affect the overhead of our protections. Furthermore, previous analysis on the SPEC CPU2006 benchmark suite has shown that only 6.5% of all pointers in a program are code pointers. Note that the pointer count provided in Table 4 also includes pointers in the statically linked newlib C library.

TABLE 4

Factors Contributing to Churn Overhead.

|  | FFT | bitcount |
|---|---|---|
| Instructions (Static Count) | 40,755 | 38,048 |
| Code Pointers | 47 | 54 |
| Data Pointers | 376 | 382 |
| Heap Size (KB) | 268 | 4 |

Qualitative Security Assessment. First, we assessed the ability of the microarchitecture 300 to resist control-flow attacks. We performed a literature study to build a collection of known control flow attack techniques, and then we gauged, for each technique, how the EMTD-based protections stopped the attack. Table 5 lists the control-flow attacks that we considered, each of which was stopped by EMTD-based protections. For each, we list the reference that introduces the attack, the attack information assets that are needed to implement the attack, and a brief summary of how the EMTD-based protections stopped the attack. Table 5 roughly orders the attacks in the order of discovery of over time.

discovery of a vulnerability in an EMTD defense, since the attacker must penetrate both the data pointers and code pointer defenses.

The third generation of control-flow attacks (i.e., ROP through counterfeit OOP), worked to side-step ASLR and data-execution prevention mechanisms by reusing existing code within the program to synthesize attacks. Besides needing to know data and code pointer values, they also must have intimate knowledge of the program code, and its location in the address space. As such, this last group requires the attack to penetrate all of Morpheus' defenses.

The last attack, i.e., Backward-Edge Overflow, represents a recently published control-flow attack thus showing that the EMTD-based protections provide future-proofing protective effects. This particular attack builds on the work of ROP and Jump-Oriented-Programming attacks in that it reuses existing code to implement an attack, and it does so in a way that side-steps Microsoft's CFI control-flow integrity technology, by implementing a control-flow attack that doesn't leave the control-flow graph.

Penetration Testing Results. To further test that the microarchitecture 300 is truly capable of stopping control-flow attacks, we performed control-flow attacks on the simulated versions of the microarchitecture having a EMTD-based protection like that of configuration 100. FIG. 6 shows the buffer overflow attack we ported to the RISC-V architecture. The attack works by overwriting the return address of

TABLE 5

Morpheus Architecture Security Analysis.
This table details a qualitative analysis of the Morpheus architecture to stop control-flow attack. The attacks are roughly ordered by date of introduction, and they demonstrate that more recent advanced attacks receive as much or more protection than earlier attacks. The final attack was disclosed after the design of the Morpheus architecture, but it is still stopped as it utilizes many already protected information assets.

| Attack Type | Info Needed | How Morpheus EMTDs Stop the Attack |
|---|---|---|
| Stack buffer overflow [19, 20] | DP | DP encrypted, cannot forge CP, cannot execute D |
| Heap spray [21] | DP | DP encrypted, cannot forge CP, cannot execute D |
| Integer overflow [22, 23] | DP | DP encrypted, cannot forge CP, cannot execute D |
| Formal string [24, 25] | DP | DP encrypted, cannot forge CP, cannot execute D |
| Heap overflow [26, 27] | DP, CP | DP encrypted, cannot forge CP, CP's expire |
| Double-free Attack [27, 28] | DP, CP | DP encrypted, cannot forge CP, CP's expire |
| VTable overflow [29] | DP, CP | DP encrypted, cannot forge CP, CP's expire |
| ROP [5] | C, CP, DP | DP encrypted, C encrypted, cannot forge CP, CP's expire |
| Return-to-libc [30] | C, CP, DP | DP encrypted, C encrypted, cannot forge CP, CP's expire |
| Jump-Oriented Prog [31] | C, CP, CP | DP encrypted, C encrypted, cannot forge CP, CP's expire |
| Counterfeit OOP [32] | C, CP, CP | DP encrypted, C encrypted, cannot forge CP, CP's expire |
| Backward-Edge Overflow [33] | C, CP, DP | DP enctypted, C encrypted, cannot forge CP, CP's expire |

It is interesting to note that the attacks become progressively more complex, and thus required additional information to synthesize a successful attack—resulting in stronger protections from the microarchitecture 300. In particular, the early attacks (i.e., buffer overflow through format string attack) only required knowledge of data pointers (stack pointer). Armed with this knowledge, these attacks inject data as code into the stack or heap. As the stack became a more hostile place for attacks, due to NX-bit protections and stack canaries, the attacks moved wholly into the heap. In the heap, attacks (i.e., heap overflow through vtable overflow) use knowledge of the dynamic storage allocation to trick programs into overwriting code pointers stored within heap structures and C++ virtual function tables. This progression in stack-bypassing control-flow attacks required knowledge of both data pointers and code pointers. As such, these attacks received more protections on the microarchitecture 300, and they are accordingly more resilient to the main( ) during the copy. The data in the string contains a return address to invoke the function malicious( ) which prints out a message indicating the attack was successful. On the baseline gem5 functional RISC-V simulator, this attack is indeed successful—the return from main( ) invokes the function malicious( ) and terminates the program. When executed on the simulated EMTD-based microarchitecture model, runtime domain enforcement protection detects that the return address from main( ), which was over-written by the string, is not a code pointer but rather data. This incurs a domain policy enforcement error on the RET instruction in main( ).

While traditional security protections work to find and fix every last vulnerability in a program, the ensembles of composable layers described herein (e.g., in the moving target defenses (EMTDs) like that of FIG. 4) take the novel approach of protecting the attack information assets that attackers need to successfully attack a system. The EMTD has been implemented on a secure architecture, which brings together multiple layers of protections to thwart all manner of control-flow attacks. Specifically, in an example, we implemented i) runtime domain enforcement, which prevents the forgery of code and pointers, ii) code and pointer encryption, which conceals these critical values from attackers, iii) code pointer disposition, which destroys the utility of code pointers by relocating the program's code segment, and iv) encryption and disposition churn, which allows these key-driven mechanisms to be re-keyed at runtime. Together, these protections demonstrate a high level of protection against control-flow with very low overheads. Compared to previous efforts in the control-flow protection space, the present techniques achieve higher levels of security at significantly lower overheads.

Figure 8:
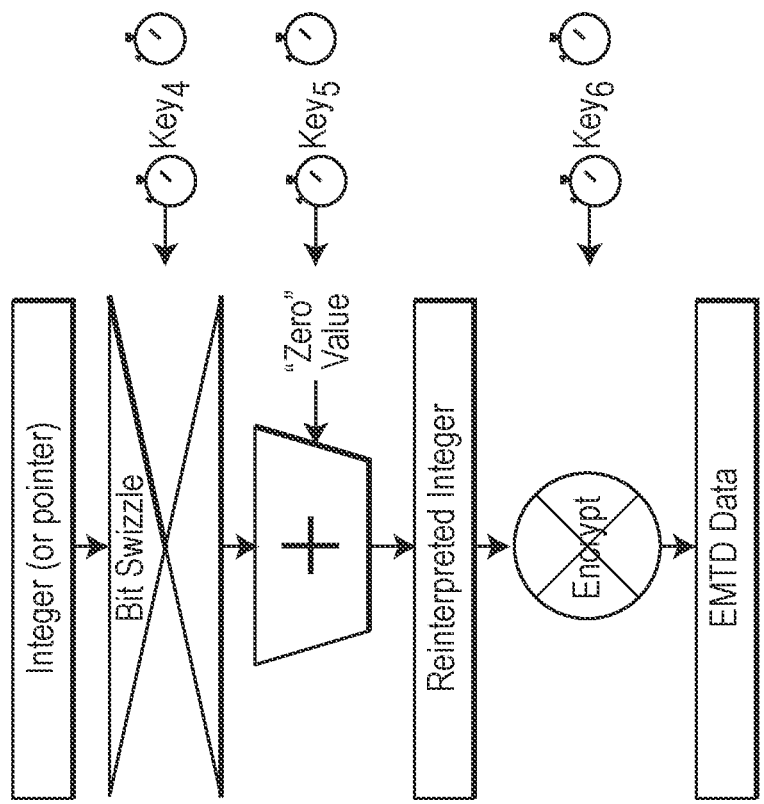
FIG. 8 illustrates an example implementation of the EMTD architecture of FIG. 7, in accordance with an example.
Figure 8:
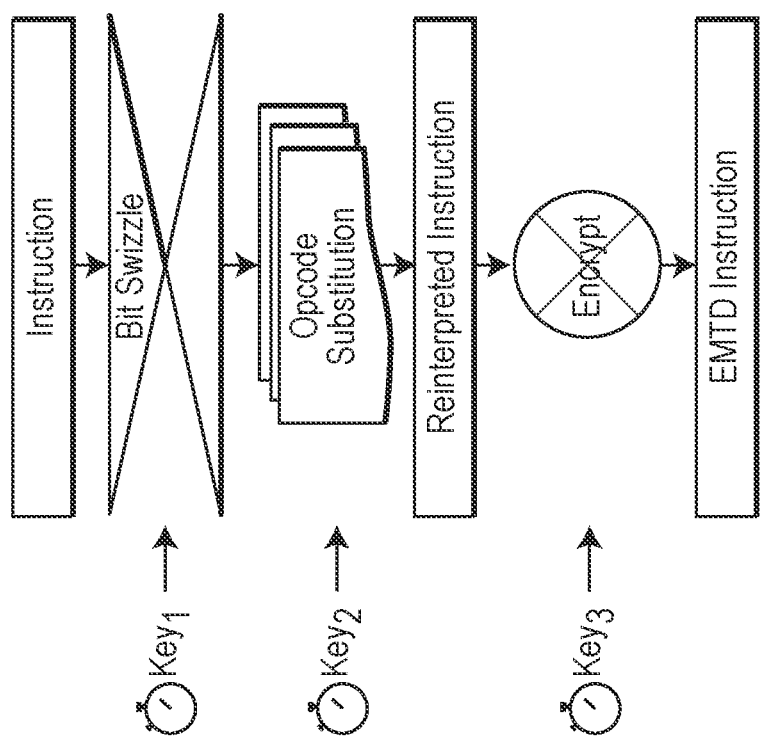

FIG. 7 illustrates an example moving target defenses (EMTDs) architecture 500 formed of an three composable layers, an encryption layer 502, a reinterpretation layer 504, and a churn layer 506 that collectively provide a layered protection over seven domains of attack information assets, code instructions, data values, pointer values, ISA (instruction set architecture), memory latency (i.e., time to access memory), code timing, and relative distance between data objects. The composable encryption layer 502 may function in a similar manner to layer 108. The churn layer 506 performs operations like that of the disposition layer described above. The reinterpretation layer 504 controls interpreter operations of a computer system, and performs a different interpretation of code, code points, data values, etc. each churn cycle. Each churn cycle attack information assets in these domains are represented in a different way within the computer system. FIG. 8 illustrates an example implementation of the three composable layers 502, 504, and 506 being applied to an instruction and to a data integer (or pointer), over a churn cycle. While FIG. 7 illustrates an example with a disposition layer, it will be appreciated that disposition, or any layer can be removed to reduce cost at the expense of security. The one exception is that in many configurations a tagging layer is desirable.

The present techniques describe ways of using composable layers for protecting attack information assets against attacks. The techniques can provide a number of advantages over conventional techniques. The techniques are scalable. Protecting a broad set of attack information assets provides protection against a broad array of security attacks, because varied attacks often utilize the same attack information assets. The techniques include composability. Protecting one attack information asset doesn't compromise another vulnerability—if the other vulnerability utilizes the same asset, it strengthens the protection for the other vulnerability. The techniques provide vulnerability tolerance. Protecting attack information assets allows the system to tolerate software vulnerabilities, layers of moving target defense protections allow the system to tolerate hardware vulnerabilities, including protection vulnerabilities. The techniques provide increased strength for advanced attacks. Many advanced attacks require greater quantities of attack information assets to be gathered, leading to tighter time constraints on synthesizing attacks on composable layered-protected systems with churn. The techniques provide protection against future unknown attacks. Future attacks are often derived from existing attacks and use a subset (or superset) of known attack assets, thus, composable layered-protected systems have the potential to partially future-proof systems.

The present techniques may be implemented to generate and execute composable layers for protecting any number of attack information assets. Example assets domain types have been described hereinabove and, more generally, include, executable code, code pointers, data pointers, return pointers, relative distance between objects, timing of operations/ memory access, ordering of variables in memory, uninitialized values of variables, resource sharing, and overflowing result values. The techniques herein are not limited by the asset type.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A computer-implemented method of securing a computer system against unauthorized access from an unauthorized agent, the method comprising:
    assigning one or more attack information assets, stored in the computer system and targetable by an unauthorized agent to exploit a vulnerability of the computer system, as corresponding to one or more information domains including at least one of a code domain, a code pointer domain, a data object domain, a data object pointer domain, a relative distance between data objects domain, or an operation timing domain; and
    for each information domain to which attack information assets were assigned, protecting the one or more attack information assets assigned to the information domain using one or more composable moving target defense layers of protection each having a respective churn cycle and a corresponding respective churn rate, wherein protecting the attack information assets includes reconfiguring each respective churn cycle at the corresponding respective churn rate.

2. The computer-implemented method of claim 1, further comprising protecting (i) the one or more attack information assets assigned to a first of the information domains and (ii) the one or more attack information assets assigned to a second of the information domains using one of the one or more composable moving target defense layers.

3. The computer-implemented method of claim 2, wherein the one or more composable moving target defense layers include at least one of (i) a disposition layer, (ii) a re-interpretation layer, or (iii) an encryption layer.

4. The computer-implemented method of claim 1, wherein protecting the attack information assets assigned to each information domain includes using a plurality of the one or more composable layers of protection, such that the attack information assets assigned to each information domain are protected by an ensemble of composable layers each having a respective attack information asset protection.

5. The computer-implemented method of claim 1, the method further comprising:
   encrypting the one or more attack information assets assigned to a first information domain with a first encryption key and encrypting the one or more attack information assets assigned to a second information domain with a second encryption key, different than the first encryption key; and
   each churn cycle, changing one or both of (i) the first encryption key and (ii) the second encryption key.

6. The computer-implemented method of claim 5, the method further comprising:
   displacing the attack information assets assigned to a first information domain using a first displacement value;
   displacing the attack information assets assigned to a second information domain using a second displacement value; and
   each churn cycle, changing one or both of (i) the first displacement value and (ii) the second displacement value.

7. The computer-implemented method of claim 6, wherein one or both of the first displacement value and the second displacement value are chosen randomly.

8. The computer-implemented method of claim 5, the method further comprising:
   representing the attack information assets assigned to a first information domain using a first representation;
   representing the attack information assets assigned to a second information domain using a second representation; and
   each churn cycle, changing one or both of (i) the first representation and (ii) the second representation.

9. The computer-implemented method of claim 1, the method further comprising:
   encrypting the attack information assets assigned to a first information domain and having a value below a threshold with a first encryption key; and
   encrypting the attack information assets assigned to the first information domain and having a value above the threshold with a second encryption key, different than the first encryption key.

10. The computer-implemented method of claim 1, the method further comprising:
    displacing the attack information assets assigned to a first information domain and having a value below a threshold value using a first displacement value; and
    displacing the attack information assets assigned to the first information domain and having a value above the threshold value using a second displacement value, different than the first displacement value.

11. The computer-implemented method of claim 9 or 10, wherein encrypting the attack information assets and displaying the attack information assets occurs during runtime operation of the computer system.

12. The computer-implemented method of claim 1, wherein the corresponding respective churn rate of at least one of the one or more composable moving target defense layers is shorter than a predetermined access vulnerability time for the computer system.

13. The computer-implemented method of claim 1, wherein each of the one or more composable moving target defense layers each has a respective churn cycle and a respective churn rate.

14. The computer-implemented method of claim 13, wherein each of one or more composable moving target defense layers has one or both of (i) a same respective churn rate, and (ii) a same respective churn cycle.

15. The computer-implemented method of claim 14, wherein the corresponding respective churn rate is determined based on network latency of a network connecting the computer system with the unauthorized agent.

16. The computer-implemented method of claim 13, wherein each of the one or more composable moving target defense layers has one or both of (i) a different respective churn rate and (ii) a different respective churn cycle.

17. The computer-implemented method of claim 1, wherein the attack information assets are stored in a memory accessible by a main processing unit of the computer system for executing regular runtime operations of the computer system, and wherein the steps of assigning the one or more attack information assets and protecting the attack information assets are executed in a dedicated security processor communicatively coupled to the main processing unit through a communication bus of the computer system or through a network communication link between the dedicated security processor and the main processing unit.

18. A computer-implemented method of securing a computer system against unauthorized access from an unauthorized agent, the method comprising:
    assigning one or more attack information assets, stored in the computer system and targetable by an unauthorized agent to exploit a vulnerability of the computer system, as one or more of information domains including at least one of a code domain, a code pointer domain, a data object domain, a data object pointer domain, a relative distance between data objects domain, or an execution timing domain; and
    for each information domain to which attack information assets were assigned, protecting the assigned one or more attack information assets using one or more composable moving target defense layers of protection, wherein at least one of the one or more composable moving target defense layers is a reconfigurable composable layer.

19. A computer-implemented method of securing a computer system against unauthorized access from an unauthorized agent, the method comprising:
    identifying one or more attack information assets targetable by an unauthorized agent to exploit a vulnerability of the computer system as corresponding to one or more information domains including at least one of a code domain, a code pointer domain, a data object domain, a data object pointer domain, a relative distance between data objects domain, or an execution timing domain;
    defining one or more composable moving target defense layers of protection each configured to provide a respective attack information asset protection;
    ensembling the one or more composable moving target defense layers to simultaneously protect the attack information assets against vulnerability of the computer system;
    reconfiguring the ensembled one or more composable moving target defense layers at a churn rate such that the vulnerability of the computer system is changed each churn cycle; and
    layering the ensembled one or more composable moving target defense layers such as at least two composable moving target defense layers protect a same information domain.

\* \* \* \* \*